(12) United States Patent
Irons et al.

(10) Patent No.: US 11,694,164 B2
(45) Date of Patent: *Jul. 4, 2023

(54) DIGITAL MAILROOM APPLICATION

(71) Applicant: DocSolid LLC, Phoenix, AZ (US)

(72) Inventors: Steven W. Irons, Phoenix, AZ (US);
David R. Guilbault, Scottsdale, AZ (US); Dale Shoup, Goodyear, AZ (US);
Michael A. Herzog, Phoenix, AZ (US)

(73) Assignee: DocSolid LLC, Phoenix, AZ (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/177,518

(22) Filed: Feb. 17, 2021

(65) Prior Publication Data

US 2022/0261762 A1 Aug. 18, 2022

(51) Int. Cl.
*G06Q 10/107* (2023.01)
*G06Q 10/105* (2023.01)
*G06Q 30/018* (2023.01)
*G06F 40/174* (2020.01)
*G06F 16/93* (2019.01)
*H04L 51/42* (2022.01)
*G06F 3/0482* (2013.01)

(52) U.S. Cl.
CPC .......... *G06Q 10/107* (2013.01); *G06F 16/93* (2019.01); *G06F 40/174* (2020.01); *G06Q 10/105* (2013.01); *G06Q 30/018* (2013.01); *H04L 51/42* (2022.05); *G06F 3/0482* (2013.01)

(58) Field of Classification Search
None
See application file for complete search history.

(56) References Cited

U.S. PATENT DOCUMENTS

| | | | |
|---|---|---|---|
| 7,446,892 B1 * | 11/2008 | Churchill | G06F 16/93 358/1.15 |
| 9,105,016 B2 * | 8/2015 | Briggman | H04L 51/42 |
| 9,996,813 B2 * | 6/2018 | Briggman | H04L 51/42 |
| 10,325,240 B2 * | 6/2019 | Briggman | G06Q 10/083 |
| 10,565,542 B2 * | 2/2020 | Briggman | G06Q 10/083 |
| 10,671,963 B2 * | 6/2020 | Briggman | H04L 51/234 |
| 11,055,653 B2 * | 7/2021 | Bornitz | G06Q 30/0207 |
| 11,386,386 B2 * | 7/2022 | Briggman | H04L 51/234 |
| 2003/0061176 A1 * | 3/2003 | Hoar | G06Q 10/107 705/402 |
| 2005/0093832 A1 * | 5/2005 | Furukawa | G06Q 10/08 345/173 |
| 2005/0132010 A1 * | 6/2005 | Muller | G06Q 10/107 709/206 |

(Continued)

*Primary Examiner* — William L Bashore
*Assistant Examiner* — Nathan K Shrewsbury
(74) *Attorney, Agent, or Firm* — Martin & Associates, LLC; Derek P. Martin

(57) ABSTRACT

A digital mailroom application is used by a mail clerk to process incoming physical mail. The digital mailroom application receives a list of mail recipients and mail delivery settings, then processes the incoming physical mail using the list of mail recipients and mail delivery settings. A piece of incoming physical mail can be processed by determining one of the mail recipients as the recipient for the piece of physical mail. The piece of physical mail is then scanned to generate a corresponding digital mail piece, which is routed electronically based on the defined mail delivery settings.

22 Claims, 13 Drawing Sheets

(56) References Cited

U.S. PATENT DOCUMENTS

| | | | |
|---|---|---|---|
| 2007/0156416 A1* | 7/2007 | Foth | G06Q 10/0835 705/336 |
| 2008/0158615 A1* | 7/2008 | Parkos | H04N 1/00127 358/402 |
| 2009/0157821 A1* | 6/2009 | Biasi | B07C 3/14 709/206 |
| 2011/0046775 A1* | 2/2011 | Bailey | G06Q 50/28 700/224 |
| 2013/0198300 A1* | 8/2013 | Briggman | H04L 51/42 709/206 |
| 2013/0211867 A1* | 8/2013 | Briggman | G06Q 10/083 705/7.18 |
| 2013/0212034 A1* | 8/2013 | Briggman | G06Q 10/1093 705/333 |
| 2013/0212037 A1* | 8/2013 | Briggman | H04L 51/42 705/341 |
| 2014/0132625 A1* | 5/2014 | Seriff | G06Q 10/107 345/619 |
| 2014/0136628 A1* | 5/2014 | Davis, Jr. | G06Q 10/107 709/206 |
| 2014/0189018 A1* | 7/2014 | Nawaz | G06F 16/245 700/227 |
| 2015/0082192 A1* | 3/2015 | Tsuruta | H04L 51/42 715/752 |
| 2015/0324743 A1* | 11/2015 | Briggman | H04L 51/234 705/333 |
| 2017/0230534 A1* | 8/2017 | Hager | H04N 1/00344 |
| 2018/0253687 A1* | 9/2018 | Bornitz | G06Q 10/0833 |
| 2018/0293540 A1* | 10/2018 | Briggman | H04L 51/234 |
| 2019/0205370 A1* | 7/2019 | Zukerman | G06V 30/387 |
| 2019/0303855 A1* | 10/2019 | Briggman | G06Q 10/0833 |
| 2021/0334747 A1* | 10/2021 | Bornitz | G06Q 30/0207 |
| 2022/0075937 A1* | 3/2022 | Saka | G06Q 10/107 |
| 2022/0261762 A1* | 8/2022 | Irons | G06Q 10/107 |
| 2022/0261763 A1* | 8/2022 | Irons | G06F 16/93 |

* cited by examiner

DIGITAL MAILROOM APPLICATION

BACKGROUND

1. Technical Field

This disclosure generally relates to processing of documents, and more specifically relates to processing incoming physical mail using a digital mailroom application.

2. Background Art

It has long been the goal of many people in the information processing field to realize a "paperless office", which means an office where physical paper documents are completely replaced with electronic documents. However, the dream of achieving a paperless office has not been achieved in most business contexts. One major challenge in achieving a paperless office is the incoming physical mail. Because incoming physical mail is in hard copy form, processes must be put in place to scan and store digital versions of the physical mail. Current methods for processing incoming physical mail are not efficient and do not specifically address the issues of those working remotely.

Applicant DocSolid, LLC owns several patents relating to document processing, including the following United States Patents, all of which are incorporated herein by reference: U.S. Pat. No. 8,787,616 issued on Jul. 22, 2014; U.S. Pat. No. 9,025,213 issued on May 5, 2015; U.S. Pat. No. 9,355,263 issued on May 31/2016; U.S. Pat. No. 9,460,356 issued on Oct. 4, 2016; U.S. Pat. No. 10,110,771 issued Oct. 23, 2018; U.S. Pat. No. 10,264,159 issued on Apr. 16, 2019; U.S. Pat. No. 10,291,796 issued on May 14, 2019; U.S. Pat. No. 10,621,239 issued on Apr. 14, 2020; U.S. Pat. No. 10,623,601 issued on Apr. 14, 2020; and U.S. Pat. No. 10,931,848 issued on Feb. 23, 2021.

The problems with current methods for processing incoming physical mail became even more evident during the recent global pandemic. Many people were immediately forced to work from home. Companies were forced to adopt quickly cobbled-together systems and procedures for distributing incoming physical mail to the intended recipients when many were not physically at the office for extended periods of time. Without a way to easily process and distribute incoming physical mail, the inefficiencies with current systems will continue to hamper a company's efforts to distribute incoming physical mail when many people are working remotely.

BRIEF SUMMARY

A digital mailroom application is used by a mail clerk to process incoming physical mail. The digital mailroom application receives a list of mail recipients and mail delivery settings, then processes the incoming physical mail using the list of mail recipients and mail delivery settings. A piece of incoming physical mail can be processed by determining one of the mail recipients as the recipient for the piece of physical mail. The piece of physical mail is then scanned to generate a corresponding digital mail piece, which is routed electronically based on the defined mail delivery settings. The mail delivery settings can specify to send a digital mail piece to one or more entities based on the recipient, sender or mail type, to send one or more notifications to one or more entities based on the recipient, sender or mail type, to perform one or more additional functions, and the format for the digital mail piece and for notification(s) for the digital mail piece.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A digital mailroom application is used by a mail clerk to process incoming physical mail. The digital mailroom application receives a list of mail recipients and mail delivery settings, then processes the incoming physical mail using the list of mail recipients and mail delivery settings. A piece of incoming physical mail can be processed by determining one of the mail recipients as the recipient for the piece of physical mail. The piece of physical mail is then scanned to generate a corresponding digital mail piece, which is routed electronically based on the defined mail delivery settings for the mail recipient. The mail delivery settings can specify to send a digital mail piece to one or more entities based on the recipient, sender or mail type, to send one or more notifications to one or more entities based on the recipient, sender or mail type, to perform one or more additional functions, and the format for the digital mail piece and for notification(s) for the digital mail piece.

Figure 1:
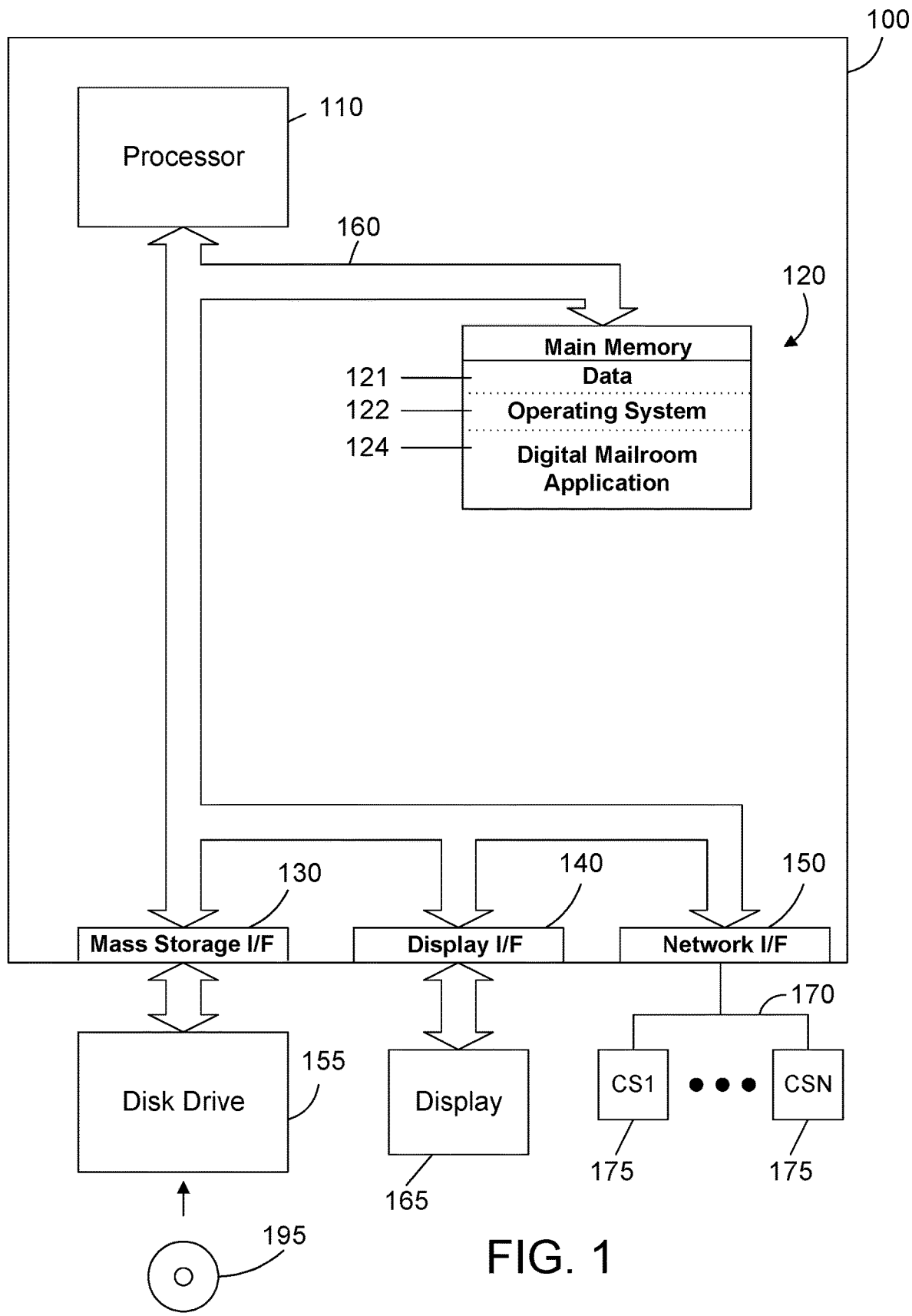
FIG. 1 is a block diagram of a computer system that includes a digital mailroom application.

Referring to FIG. 1, computer system 100 is one suitable implementation of a computer system that includes the digital mailroom application disclosed and claimed herein. Computer system 100 could be any suitable computer system, such as an IBM POWER computer system. However, those skilled in the art will appreciate that the disclosure herein applies equally to any computer system, regardless of whether the computer system is a complicated multi-user computing apparatus, a single user workstation, an embedded control system, or a mobile device such as a smart phone, tablet computer, laptop computer, etc. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a disk drive 155, to computer system 100. One specific type of disk drive 155 is a readable and writable CD-RW drive, which may store data to and read data from a CD-RW 195. CD-RW 195 is one suitable example of non-transitory computer readable media.

Main memory 120 preferably contains data 121, an operating system 122, and a digital mailroom application 124. The digital mailroom application 124 allows a mail clerk to process incoming physical mail according to a defined list of mail recipients and defined mail delivery settings. Details regarding possible functions of the digital mailroom application 124 are given below.

Computer system 100 can utilize well known virtual addressing mechanisms that allow the programs of computer system 100 to behave as if they only have access to a large, single storage entity instead of access to multiple, smaller storage entities such as main memory 120 and disk drive 155. Therefore, while data 121, operating system 122, and digital mailroom application 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. In addition, computer system 100 could include one or more virtual machines, with the digital mailroom application 124 running on one of the virtual machines.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. The digital mailroom application 124 may then be run under control of the operating system 122. In an alternative, the digital mailroom application 124 could include boot code that allows it to boot the computer system and run without the need for a separate operating system 122.

Although computer system 100 is shown to contain only a single processor and a single system bus, those skilled in the art will appreciate that a digital mailroom application as disclosed and claimed herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 (shown in FIG. 1 as CS1, . . . CSN) via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by a communication manager within network interface 150.

As will be appreciated by one skilled in the art, aspects of the disclosed digital mailroom application may be embodied as a system, method or computer program product. Accordingly, aspects of the digital mailroom application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the digital mailroom application may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the digital mailroom application are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the prior art, processing and routing incoming physical mail to recipients and generating appropriate notifications is a highly manual process that is subject to many sources of human error. The digital mailroom application disclosed and claimed herein removes many sources of human error and automates much of the routing and notifications associated with processing incoming physical mail.

The disclosure and claims herein relate to the processing of incoming physical mail. This mail can be physical mail from any suitable carrier, including governmental postal agencies such as the United States Postal Service, and private couriers including FedEx, UPS, DHL, etc. For the sake of convenience and ease of reading and comprehension, sometimes the term "incoming physical mail" is shortened to "mail" or "piece of mail." It is understood that the digital mailroom application and associated methods disclosed and claimed herein relate to the processing of incoming physical mail, and do not relate to processing electronic messages such as emails, text messages, etc.

Figure 2:
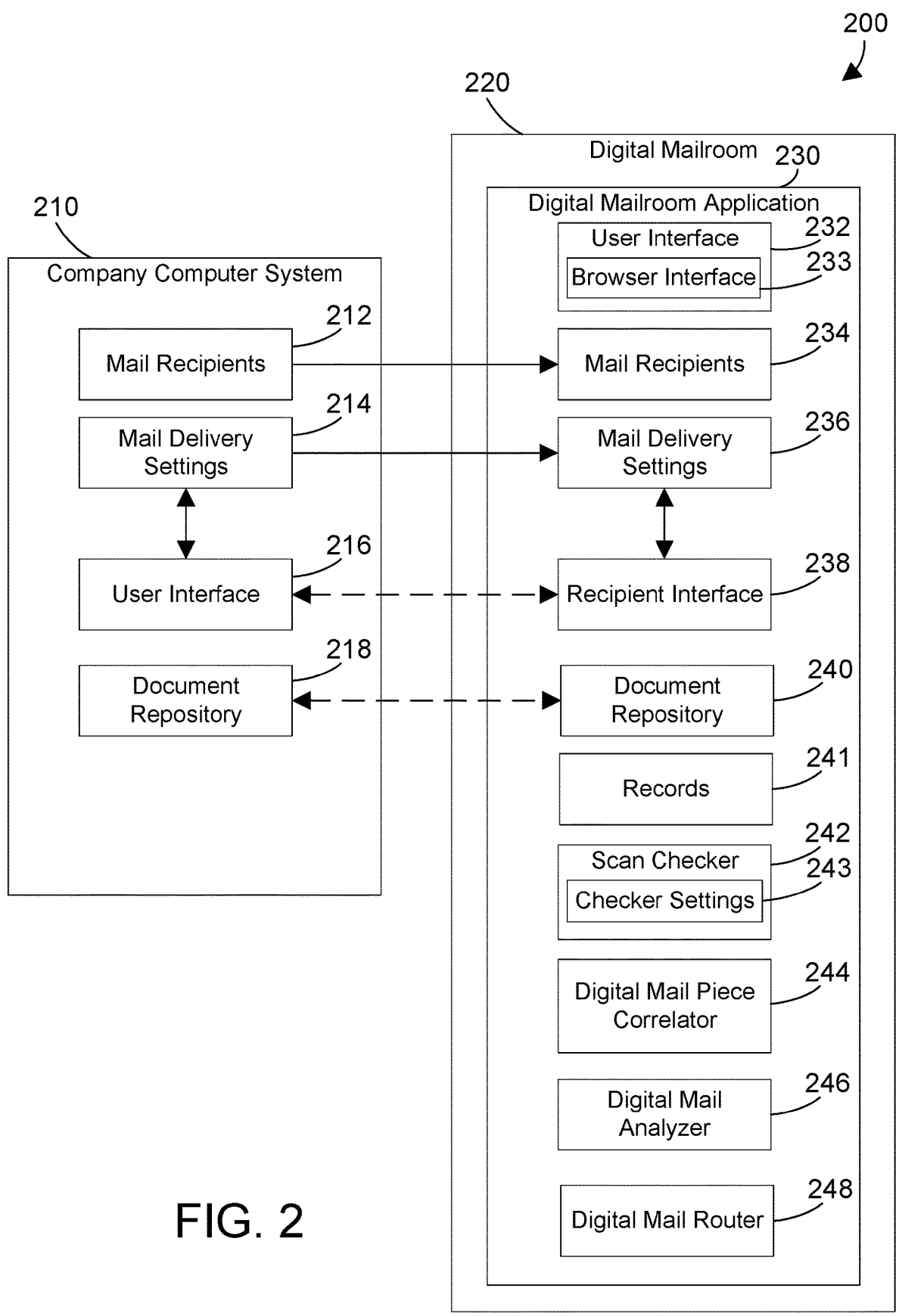
FIG. 2 is a block diagram of a system that includes one specific implementation of the digital mailroom application shown in FIG. 1.

Referring to FIG. 2, a system 200 includes a company computer system 210 and a digital mailroom 220. The company computer system 210 includes a list of mail recipients 212, one or more mail delivery settings 214, a user interface 216, and a document repository 218. The mail recipients 212 includes a list of all recipients in the company that might receive incoming physical mail. Mail recipients 212 may include people as well as organizations, departments, groups, etc. Thus, a piece of mail that is an invoice may be addressed to "Accounts Payable", which could be one of the defined mail recipients 212. The mail delivery settings 214 represent settings that govern how incoming physical mail is processed, delivered, and how notifications are made. Details of the mail delivery settings 214 are discussed in detail below. The user interface 216 allows authorized users to access the company computer system 210 to update the mail recipients 212 and the mail delivery settings 214. The user interface 216 can include, for example, an interface for individual users who are on the list of mail recipients 212 to update their own mail delivery settings 214. The document repository 218 could be any suitable repository, such as a repository in a document management system, a folder, a directory, a database, etc.

The digital mailroom 220 includes a digital mailroom application 230 that includes a user interface 232, a list of mail recipients 234, a list of mail delivery settings 236, a recipient interface 238, a document repository 240, records 241, a scan checker 242, a digital mail piece correlator 244, a digital mail analyzer 246, and a digital mail router 248. The digital mailroom application 230 is one specific example of the digital mailroom application 124 shown in FIG. 1. The user interface 232 is preferably a graphical user interface. In a preferred implementation, the user interface 232 comprises a browser interface 233 that allows a mail clerk to access the digital mailroom application 230 on any suitable device that includes a web browser. The mail recipients 234 represent a copy of the mail recipients 212 received from the company computer system 210. Likewise, the mail delivery settings 236 represent a copy of the mail delivery settings 214 received from the company computer system 210. The mail recipients 234 and mail delivery settings 236 can be kept up to date using any suitable method. For example, the company computer system 210 could send the mail recipients 212 and mail delivery settings 214 to the digital mailroom application once each day. In the alternative, the mail recipients 234 could be a mirrored or shared list that is updated automatically in near real-time when the mail recipients 212 in the company computer system 210 change.

Similarly, the mail delivery settings 236 could be a mirrored or shared list that is updated automatically in near real-time when the mail delivery settings 214 in the company computer system 210 change. The disclosure and claims herein expressly extend to any suitable method for the digital mailroom application 230 to receive and update the mail recipients 234 and the mail delivery settings 236 from the company computer system 210.

The recipient interface 238 in the digital mailroom application 230 allows a mail recipient to change the recipient's mail delivery settings, which are part of the mail delivery settings 236. Note the recipient interface 238 could be accessed by a recipient directly, such as via a web browser, or could be accessed via the user interface 216 in the company computer system 210, as represented by the dotted line between the user interface 216 and the recipient interface 238 in FIG. 2. Of course, the recipient interface 238 could also be integrated into the user interface 232 to allow both mail clerks and recipients to access the digital mailroom application using the same interface.

The digital mailroom application 230 can include its own document repository 240 for storing digital mail pieces processed by the digital mailroom application 230. In one specific implementation, the document repository 240 is separate and distinct from the document repository 218 in the company computer system 210. In another specific implementation, the document repository 240 is a mirrored or shared repository with the document repository 218, as indicated by the dashed line in FIG. 2 that connects the document repository 218 and the document repository 240.

The digital mailroom application includes records 241. Each record in the digital mailroom application corresponds to a received physical piece of mail. A mail clerk can open a new record for a selected piece of mail, and when the digital mail piece is returned to the digital mail application 230, the digital mail piece correlator 244 correlates the digital mail piece to the corresponding record in the digital mailroom application. In a preferred embodiment the digital mail piece correlator 244 correlates the digital mail piece to the corresponding record in the digital mailroom application using a globally unique identifier.

The scan checker 242 performs quality assurance operations on a scanned piece of mail, which is referred to herein as a digital mail piece. For example, the scan checker can perform operations such as those discussed in U.S. Pat. No. 9,406,356, including verifying a page count of the digital mail piece corresponds to a page count of the physical piece of mail, verifying each page of the digital mail piece is in a correct orientation, and verifying each page of the digital mail piece is complete. Of course, other quality assurance operations could also be performed by the scan checker 242. Scan checker 242 preferably interacts with a person, who visually inspects the scanned images of a document. Scan checker 242 functions according to checker settings 243. Checker settings 243 could specify each type of quality assurance operation that needs to be performed, and how frequently these operations need to be performed. For example, the checker settings 243 could specify that only every tenth document needs to be checked, that large thumbnails are displayed, and the specified checks could include verifying a page count of the digital mail piece corresponds to a page count of the physical piece of mail, verifying each page of the digital mail piece is in a correct orientation, and verifying each page of the digital mail piece is complete. The checker settings 243 may be set by a system administrator, but the checker settings 243 could also be specified in the mail delivery settings 236.

The digital mail piece correlator 244 correlates a scanned image that is a digital mail piece to a record that is one of the records 241 in the digital mailroom application. One specific way for the digital mail piece correlator to correlate a digital mail piece to the record in the digital mailroom application uses sequentially numbered stamps placed on the physical mail piece being scanned, as described in more detail below with reference to FIG. 18. The digital mail piece correlator 244 may also be configured to create a record if one does not exist. The digital mail piece correlator 244 can optionally check to make sure a piece of mail is scanned within a set period of time. For example, if a mail clerk created a record for a piece of mail but forgot to scan the piece of mail, the digital mail piece correlator 244 could notify the mail clerk after 24 hours that a digital mail piece has not yet been correlated to the record.

The digital mail analyzer 246 preferably performs optical character recognition on a digital mail piece to generate corresponding text, and then performs analysis of the text to identify specific attributes of the digital mail piece. The digital mail analyzer 246 can auto-fill one or more fields in an input screen for a record in the user interface 232 in the digital mailroom application 230 based on the analysis of the digital mail piece. The digital mail analyzer 246 can also determine from the analyzed text corresponding index information for the digital mail piece that can be used to store the digital mail piece in a document management system. The digital mail router 248 routes a digital mail piece to one or more entities and provides one or more notifications of the digital mail piece according to the mail delivery settings 236.

Figure 3:
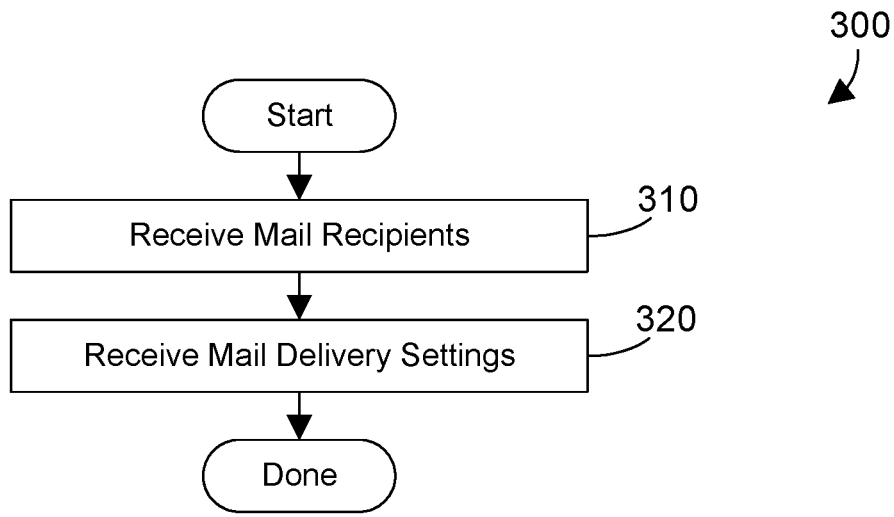
FIG. 3 is a flow diagram of a method for a digital mailroom application to receive mail recipient and mail delivery settings.

Referring to FIG. 3, a method 300 is preferably performed by the digital mailroom application. A list of mail recipients is received (step 310). Mail delivery settings are also received (step 320). Method 300 is then done. Once the digital mailroom application has the list of mail recipients and the list of mail delivery settings, the digital mailroom application is ready to process incoming physical mail.

Figure 4:
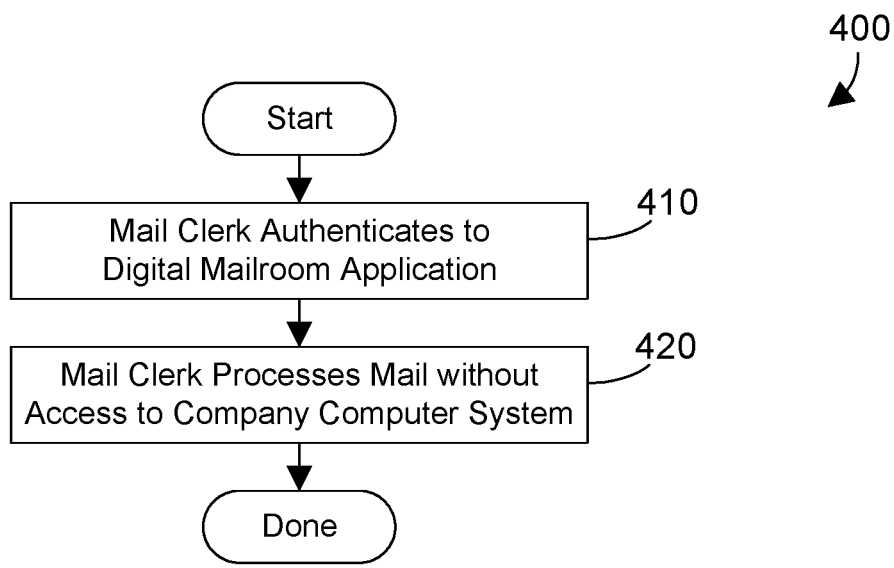
FIG. 4 is a flow diagram of a method for a mail clerk to process incoming physical mail without accessing a company computer system.

FIG. 4 shows a method 400 for a mail clerk to process incoming physical mail. The mail clerk authenticates to the digital mailroom application (step 410) using any suitable authentication mechanism, whether currently known or developed in the future. Known methods for authenticating to a software application include a username and password, biometric such as a fingerprint scan, facial scan, voice recognition, or other authentication means. Once the mail clerk authenticates to the digital mailroom application in step 410, the mail clerk can process incoming physical mail without accessing the company computer system (step 420). By providing a digital mailroom application that is not part of the company computer system, the processing of incoming physical mail can be done by a mail clerk that does not need to have any experience or training with any of the software or systems in the company computer system. In addition, mail processing can be performed using method 400 in FIG. 4 by a third party that is not part of the company and that is remote from the company computer system.

Figure 5:
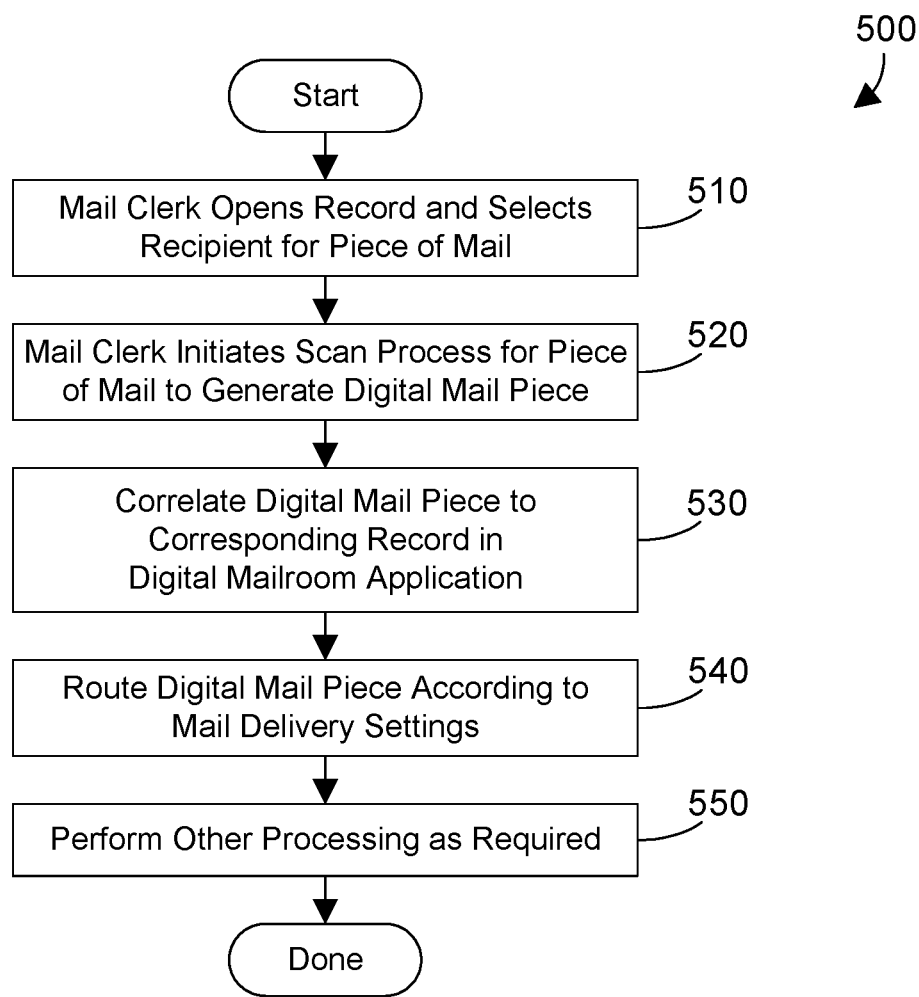
FIG. 5 is a flow diagram of a method for processing a piece of mail by a mail clerk using the digital mailroom application.

Once the mail recipients and mail delivery settings have been received as shown in FIG. 3, and the mail clerk has authenticated to the digital mailroom application in step 410, the mail clerk may now process incoming physical mail using the digital mailroom application. One suitable method 500 for processing mail using the digital mailroom application is shown in FIG. 5. The mail clerk opens a new record in the digital mailroom application for a physical piece of mail and selects the recipient for the physical piece of mail (step 510). The mail clerk initiates a scan process for the piece of mail to generate a digital mail piece (step 520). The digital mail piece is correlated to the corresponding record in the digital mailroom application (step 530). The digital mail piece is then routed according to the mail delivery settings (step 540). The routing can include, for example, sending the digital mail piece to any suitable entity, which may include, without limitation, one or more people, organizations, workgroups, departments, groups, functions, processes, workflows, transactions, etc. Other processing specified in the mail delivery settings can also be performed, as required (step 550). Examples of other processing that could be performed in step 550 include, without limitation, providing notifications, storing the digital mail piece in a repository, enforcing an ethical wall or legal hold, enforcing regulatory compliance, etc.

The term "mail delivery settings" broadly encompasses any information that can be used to determine how a digital mail piece is processed and functions that can be performed as a result of processing a digital mail piece. Examples of categories of mail delivery settings are shown in table 600 in FIG. 6, and include: send digital mail piece to one or more entities based on the recipient, sender or mail type 610; send one or more notifications to one or more entities based on the recipient, sender or mail type 620; one or more additional functions 630; and a digital mail piece/notification format 640. According to settings 610, the digital mail piece can be sent to one or more entities in 610. Entities can include people, organizations, workgroups, departments, groups, functions, processes, workflows, transactions, etc. Entities can broadly include any type of entity to which a digital mail piece could be sent. According to settings 620, notifications can be sent to one or more entities. Notifications can be any suitable notification, most preferably being electronic notifications such as a text message or email. However, notifications can also be physical notifications such as a blinking light or audible sound that notifies a person. In a very simple example, an executive at a company might specify for her mail to get routed to both her and her executive assistant, while notification of the mail goes only to the executive assistant, who is responsible for notifying the executive when the mail requires her personal review, as opposed to routine mail that the executive assistant can handle without the executive's input.

The additional function(s) 630 can include any suitable functions that need to be performed. For example, additional function(s) 630 can specify to store the digital mail piece in a repository of a document management system. Additional function(s) 630 can specify to send the digital mail piece to a particular workflow. This would allow, for example, an invoice to be routed to an accounts payable workflow. Of course, additional function(s) 630 can broadly encompass any suitable function that may be performed by the digital mailroom application when processing mail. Additional function(s) 630 could be performed, for example, during step 550 in FIG. 5.

The settings in the digital mail piece/notification format 640 allow a recipient or administrator to specify what is included in a digital mail piece or a notification of a digital mail piece. For example, the digital mail piece itself could be sent with a thumbnail of the first page of the digital mail piece, or with thumbnails of all pages of the digital mail piece. Text in the message that includes the digital mail piece could be specified, along with text in the notification(s). The font type and size could also be specified. A link to the digital mail piece in a document repository can be provided with a notification. A text version of the digital mail piece could also be sent. The settings 640 for digital mail piece/notification format expressly extend to any suitable way for specifying the formatting and what is included in a message that includes the digital mail piece or the formatting and what is included in a notification of the digital mail piece.

Figure 6:
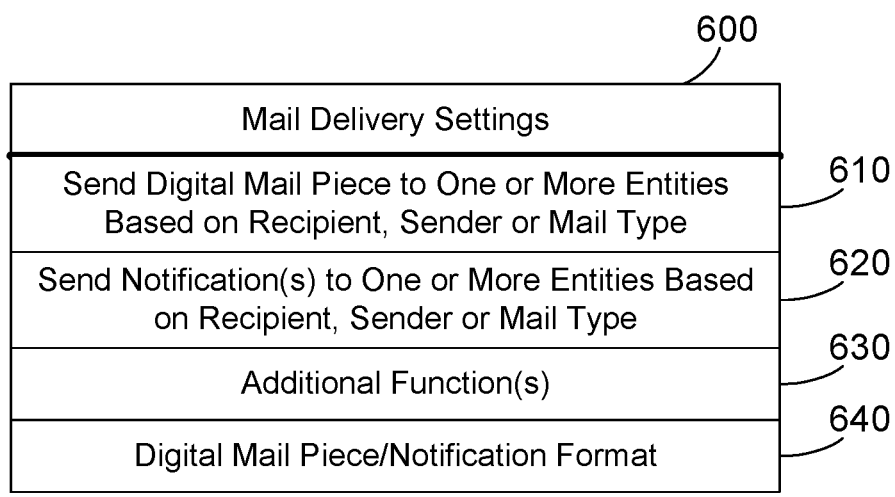
FIG. 6 is a table showing sample mail delivery settings.
Figure 7:
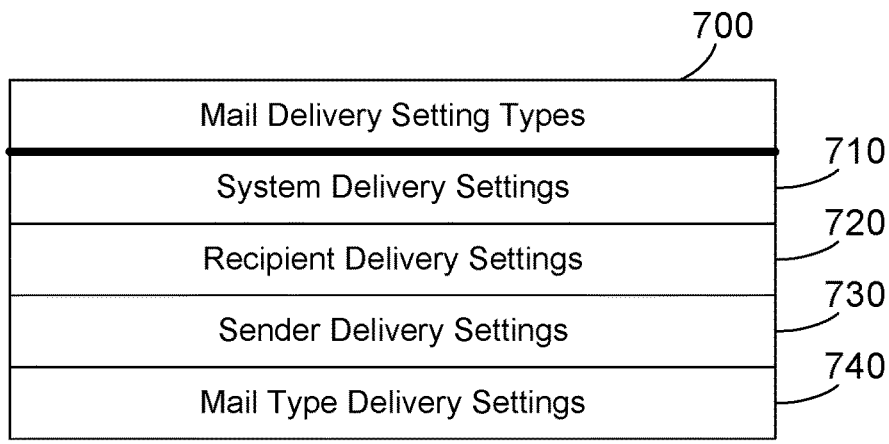
FIG. 7 is table showing four different mail delivery setting types.
Figure 8:
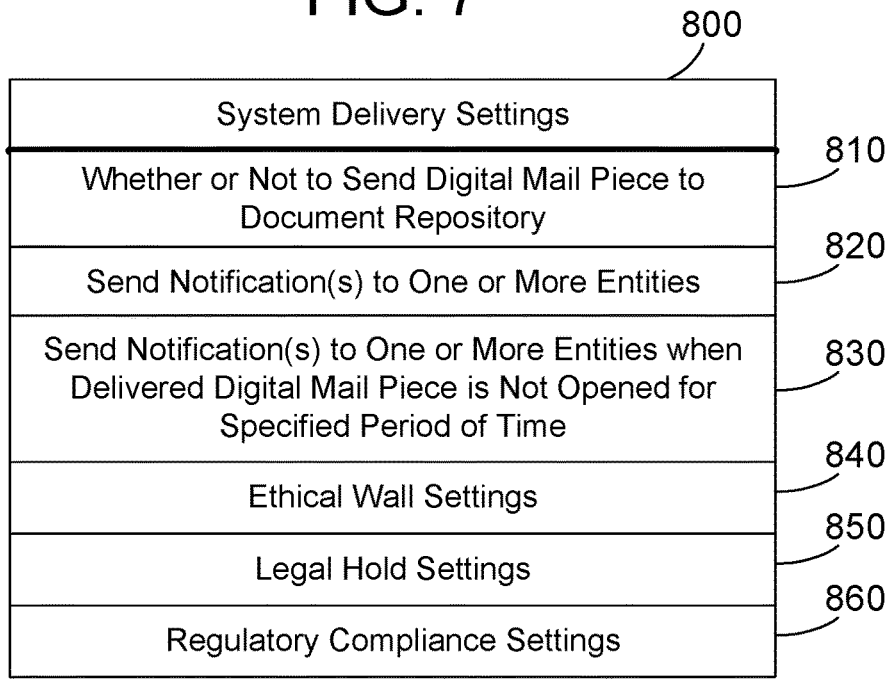
FIG. 8 is a table showing some suitable examples of system delivery settings.

Mail delivery settings can be separated into different categories, as shown in FIG. 6. An example of another way to categorize mail delivery settings is shown in table 700 in FIG. 7. Four mail delivery setting types are defined, namely: system delivery settings 710; recipient delivery settings 720; sender delivery settings 730; and mail type delivery settings 740. System delivery settings 710 can include any suitable setting that may not be specifically related to a specific recipient, sender or mail type. Examples of suitable system delivery settings 710 in FIG. 7 are shown in table 800 in FIG. 8 to include: whether or not to send the digital mail piece to a document repository 810; specifying to send one or more notifications to one or more entities 820; specifying to send one or more notifications to one or more entities when a delivered digital mail piece is not opened for a specified period of time 830; ethical wall settings 840; legal hold settings 850; and regulatory compliance settings 860. Ethical wall settings 840 are especially useful for a law firm that has certain attorneys who cannot work on some matters due to the need for a separation between attorneys known as an "ethical wall." Ethical wall settings 840 can thus specify law firm matters or clients, and can then specify entities to which mail can be sent for a specific matter or sender and can further specify entities to which mail cannot be sent for the matter or sender. Legal hold settings 850 can specify senders, client or matters for which there is a legal hold due to impending or pending litigation. Legal hold settings 850 can specify that the digital mail piece, and optionally the corresponding physical piece of mail, be retained for a specified period of time, which can be finite or can be indefinite. The legal hold settings 850 can override other settings and system settings to assure a digital mail piece and possibly the corresponding physical piece of mail is retained instead of applying normal disposition practices. Many companies have specific regulations they must comply with. Regulatory compliance settings 860 can be applied to assure the regulations are complied with relating to the receipt and disposition of physical mail by defining processing corresponding to the digital mail piece to assure regulatory compliance. While not shown in FIG. 8, system delivery settings 800 could also define the settings that are available in the recipient delivery settings 720, sender delivery settings 730 and mail type delivery settings 740 in FIG. 7.

Figure 9:
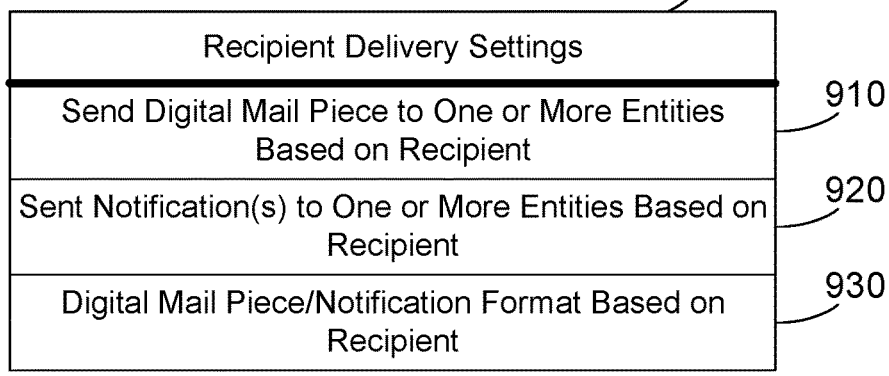
FIG. 9 is a table showing some suitable examples of recipient delivery settings.

Recipient delivery settings 720 can include any suitable setting that relates to a mail recipient. Examples of suitable recipient delivery settings 720 in FIG. 7 are shown in table 900 in FIG. 9 to include: specifying to send the digital mail piece to one or more entities based on the mail recipient 910; specifying to send one or more notifications to one or more entities based on the mail recipient 920; and specifying digital mail piece/notification format based on the mail recipient 930. Note that mail recipients may be people or may be groups or organizations. In the most preferred implementation, a person who is a mail recipient has access to the digital mailroom application via the recipient interface 238 shown in FIG. 2 to define his or her recipient delivery settings according to the mail recipient's personal preferences.

Figure 10:
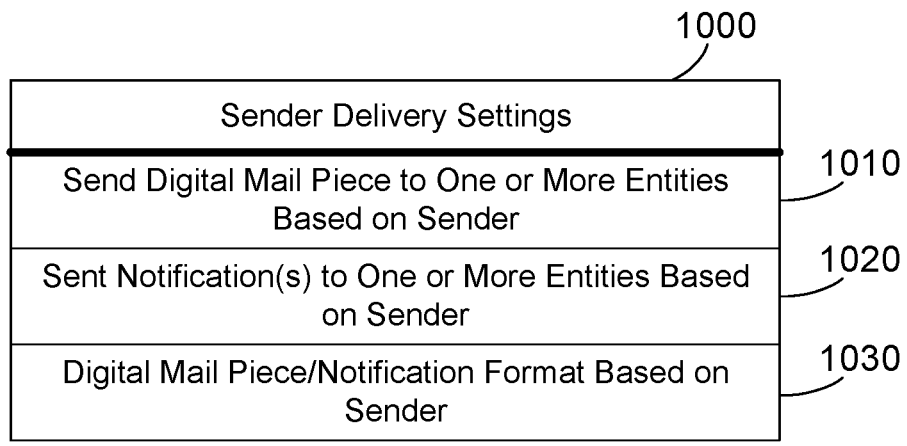
FIG. 10 is a table showing some suitable examples of sender delivery settings.

Sender delivery settings 730 can include any suitable setting that relates to a sender of physical mail. Examples of suitable sender delivery settings 730 in FIG. 7 are shown in table 1000 in FIG. 10 to include: specifying to send the digital mail piece to one or more entities based on the sender

1010; specifying to send one or more notifications to one or more entities based on the sender 1020; and specifying digital mail piece/notification format based on the sender 1030. The reason for sender delivery settings is to accommodate different needs for mail processing according to the sender. For example, a physical piece of mail from the United States District Court for the Central District of California may need to have different processing (including different or additional recipients and notifications) than a physical piece of mail from a Superior Court in Stanislaus County, California. The sender delivery settings 1000 allow defining any suitable setting for processing incoming physical mail according to the sender.

Figure 11:
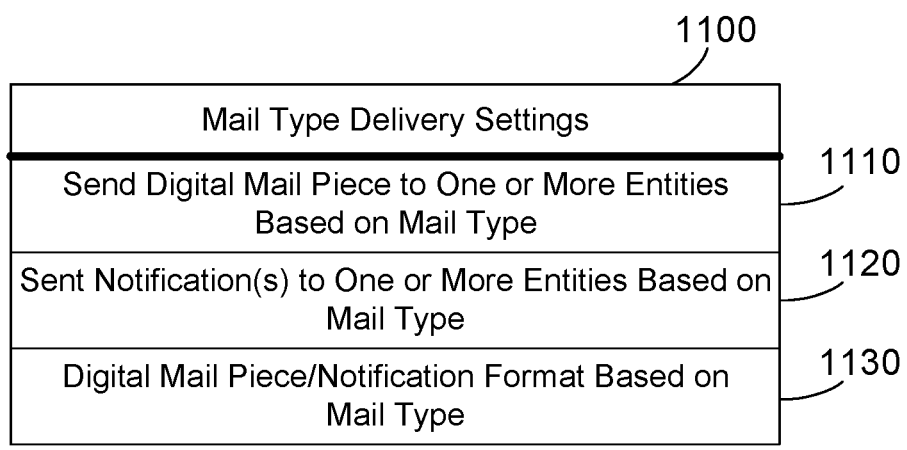
FIG. 11 is a table showing some suitable examples of mail type delivery settings.

Mail type delivery settings 740 can include any suitable setting that relates to a type of physical mail. Examples of suitable mail type delivery settings 740 in FIG. 7 are shown in table 1100 in FIG. 11 to include: specifying to send the digital mail piece to one or more entities based on the mail type 1110; specifying to send one or more notifications to one or more entities based on the mail type 1120; and specifying digital mail piece/notification format based on the mail type 1130. The reason for mail type delivery settings is to accommodate different needs for mail processing according to the type of mail received. For example, a civil court order from the United States District Court for the Central District of California may need to have different processing (including different or additional recipients and notifications) than a bankruptcy court order from the same court. A document from a courier such as Fed Ex or UPS may need different processing than a document received in the mail. The mail type delivery settings 1100 allow defining any suitable setting for processing incoming physical mail according to the mail type of the incoming physical piece of mail. Mail type delivery settings 1100 can also define a priority where some types of mail are treated as high priority while others are normal or low priority.

Note the mail delivery settings in FIG. 7 can be specified in a hierarchy so potential conflicts can be resolved. For example, the system delivery settings 710 could be set by a system administrator, and could always be enforced. The sender delivery settings 730 could be next lower in priority, followed by the mail type delivery settings 740, with the recipient delivery settings 720 being the lowest in the priority hierarchy. This means if a recipient delivery setting conflicts with a sender delivery setting, the sender delivery setting could have the higher priority and override the recipient delivery setting. However, the mail delivery settings could be additive as well instead of in a defined priority. Thus, if a sender delivery setting specifies to send a digital mail piece corresponding to incoming physical piece of mail to Barbara, and a recipient delivery setting specifies to send the digital mail piece to Jim, the digital mail piece can be sent to both. If a mail type delivery setting specifies to include thumbnails of all pages and a recipient delivery setting specifies to include a thumbnail of the first page, all thumbnails could be included, which satisfies both. In essence, the mail delivery settings can be additive, or a superset, in most cases. But in cases where there is a conflict, a hierarchy of priority of the settings can resolve the conflict. Note that such a hierarchy is optional, and need not necessarily be defined.

Figure 12:
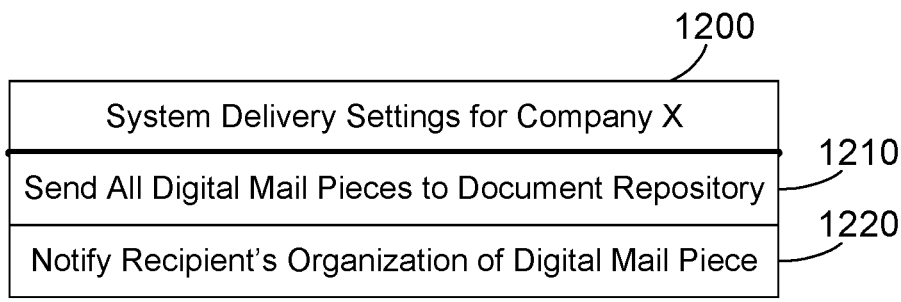
FIG. 12 is a table showing suitable examples of system delivery settings for a company.

Some specific examples are now provided to illustrate the use of mail delivery settings. Referring to FIG. 12, we assume a company we call Company X has system delivery settings 1200 defined that include specifying to send all digital mail pieces to a document repository 1210 and to notify a mail recipient's organization when a digital mail piece is received 1220. Storing all digital mail pieces in a document repository allows the digital mail pieces to be managed by the company's document management system. Notifying a recipient's organization can be useful, for example, so an administrative assistant can track all incoming mail to all recipients in an organization or department, such as the Sales Department.

Figure 13:
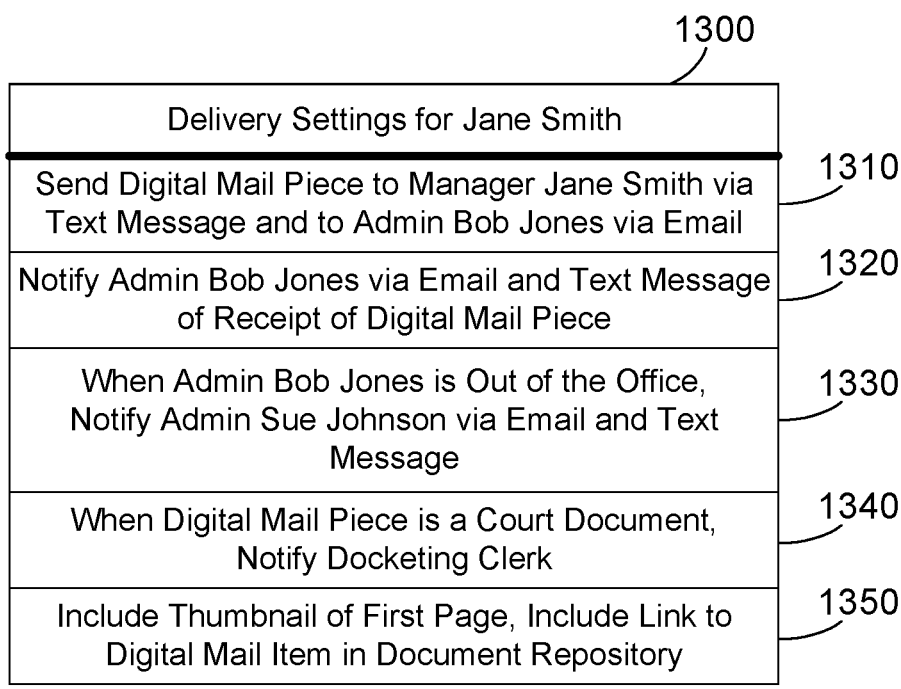
FIG. 13 is a table showing sample recipient delivery settings for a specific mail recipient.

FIG. 13 shows sample recipient delivery settings 1300 for a specified mail recipient named Jane Smith. We assume for this example that Jane Smith is a manager for Company X, and that Jane Smith herself specified the delivery settings 1300 in FIG. 13 via the recipient interface 238 shown in FIG. 2. Setting 1310 specifies to send a digital mail piece addressed to Jane Smith to Manager Jane Smith via text message and to her administrative assistant (admin) Bob Jones via email. Note that the piece of mail was addressed to Jane Smith. Jane Smith is thus the addressee of the piece of mail, but Bob Jones is not the addressee. Setting 1320 specifies to notify admin Bob Jones via email and text message of the receipt of the digital mail piece. This example assumes that Jane prefers for Bob to handle the processing of mail pieces, trusting Bob to handle all mail he can handle while passing on the important mail pieces to Jane later on for the things that require Jane's attention. Setting 1330 specifies that when admin Bob Jones is out of the office, to notify admin Sue Johnson via email and text message. We assume Sue Johnson handles Bob's workload when Bob is not in the office. Setting 1340 specifies when the digital mail piece is a court document, to notify the docketing clerk. This notification could include sending the digital mail piece to the docketing clerk so the docketing clerk can docket any dates or deadlines triggered by the court document. Setting 1350 specifies to include a thumbnail of the first page in the message that includes the digital mail piece and any notifications, and to include a link to the digital mail piece in the document repository in the message or notifications.

Figure 14:
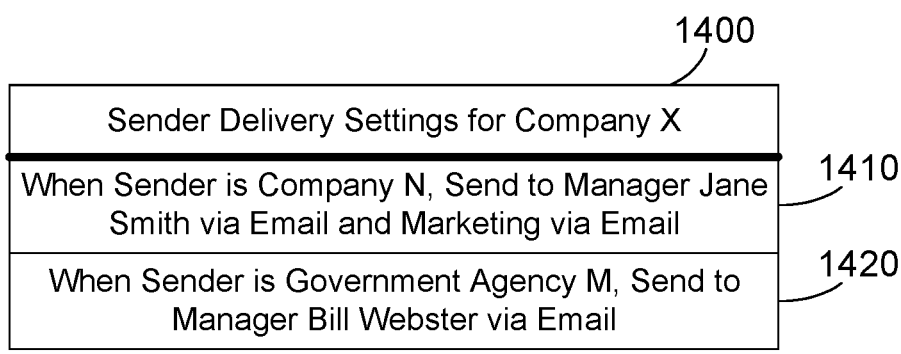
FIG. 14 is a table showing sample sender delivery settings.

FIG. 14 shows sender delivery settings 1400 that are defined for Company X. Setting 1410 specifies when the sender of an incoming physical piece of mail is Company N, to send the digital mail piece to manager Jane Smith and to the Marketing organization via email. Setting 1420 specifies when the sender is Government Agency M, send the digital mail piece to manager Bill Webster via email.

Figure 15:
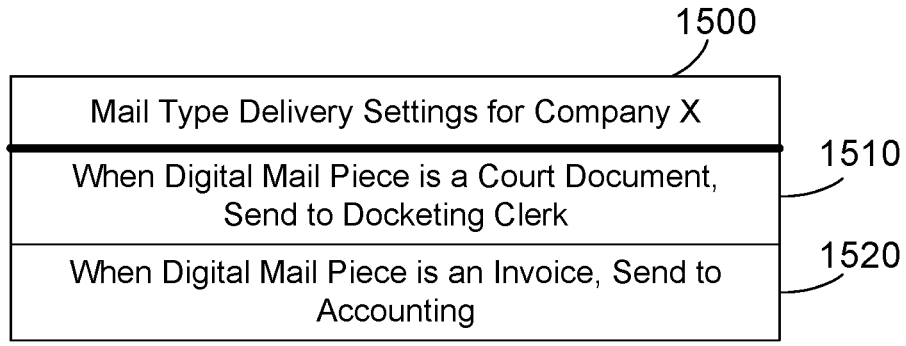
FIG. 15 is a table showing sample mail type delivery settings.

FIG. 15 shows mail type delivery settings 1500 that are defined for Company X. Setting 1510 specifies that when the digital mail piece is a court document, send the digital mail piece to the docketing clerk. Setting 1520 specifies when the digital mail piece is an invoice, send the digital mail piece to the Accounting department.

Figure 16:
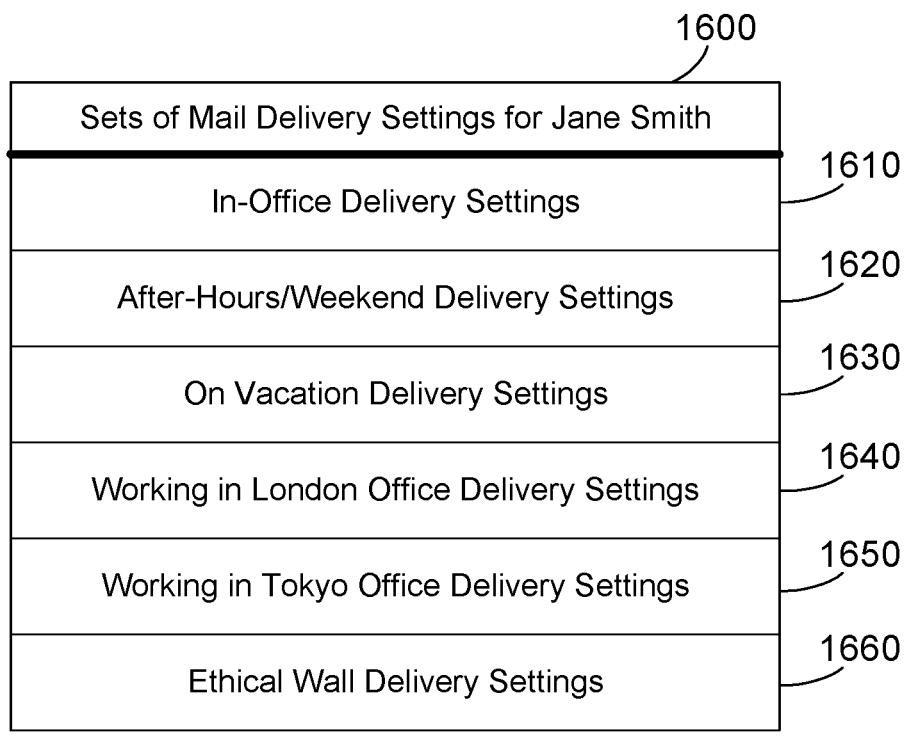
FIG. 16 is a table showing multiple sets of mail recipient delivery settings that can be selected by the mail recipient.

A mail recipient can have multiple different sets of mail settings that can be selected and applied as needed by the recipient or may be applied automatically by the digital mailroom application. FIG. 16 shows a table 1600 with sets of mail delivery settings for the manager Jane Smith. Defined mail delivery settings for Jane Smith include: in-office delivery settings 1610; after-hours/weekend delivery settings 1620; on vacation delivery settings 1640; working in London office delivery settings 1640; working in Tokyo office delivery settings 1650; and ethical wall delivery settings 1660. The in-office delivery settings and after-hours/weekend delivery settings can be defined in any suitable way. For example, if Jane normally works from 9 AM to 5 PM on Monday through Friday, the digital mailroom application can automatically apply the in-office delivery settings 1610 from 9 AM to 5 PM Monday through Friday, and can automatically apply the after-hours/weekend delivery settings 1620 at all other times. Jane can select vacation delivery settings 1630 when Jane is on vacation, or can select the working in London office delivery settings 1640 when she's working in the London office or working in Tokyo office delivery settings 1650 when she's working in the Tokyo office. In the law firm context, the ethical wall delivery settings 1660 can define matters Jane is working on that cannot be shared with one or more attorneys in the firm, and can further define matters other attorneys in the firm are working on that cannot be shared with Jane. While the specific example shown in FIG. 16 shows sets of mail delivery settings for a person, similar sets of mail delivery settings could be defined for any defined recipient, such as a group or organization.

The simple examples in FIGS. 12-16 are for the purpose of illustration, and are not limiting. The number and types of mail delivery settings can be quite large. Other types of mail delivery settings could be defined. For example, while some settings specify an entity, such as a person or an organization, to which a digital mail piece should be delivered, a different setting could specify an entity to which a digital mail piece must not be delivered. This is a feature that is very useful for large law firms that sometimes have potential or actual conflicts arise with one of the attorneys and must build an "ethical wall" so the conflicted attorney does not see any of the information relating to the matter for which the attorney is blocked by the ethical wall.

Figure 17:
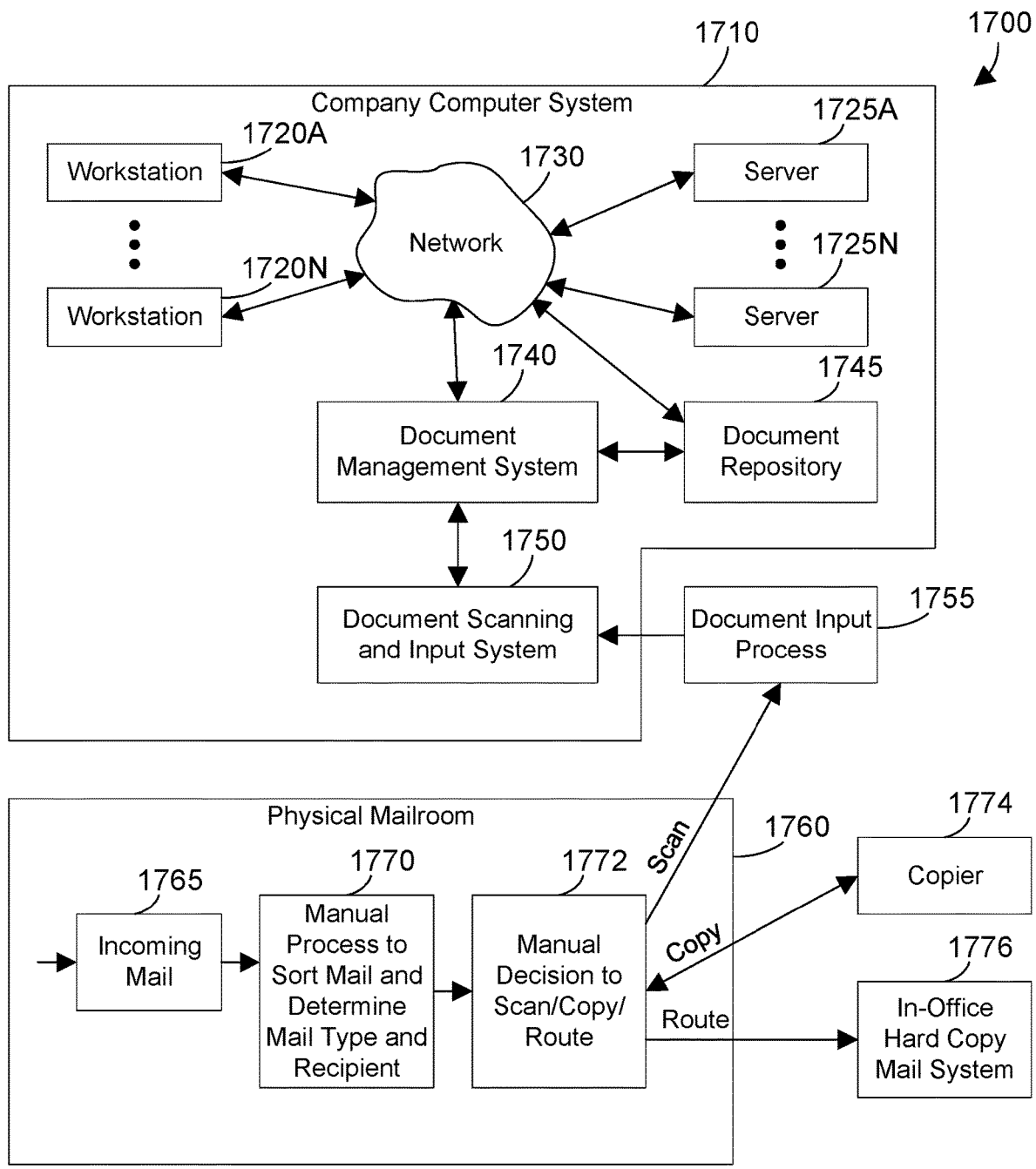
FIG. 17 is a block diagram of a prior art system that includes a company computer system and a physical mailroom.

FIG. 17 shows a prior art system 1700 used to process physical mail. A company computer system 1710 includes multiple workstations 1720, shown as 1720A, . . . , 1720N in FIG. 17, and multiple servers 1725, shown as server 1725A, . . . . 1725N, connected to a network 1730. The company computer system 1710 further includes a document management system 1740 that stores and manages documents in a document repository 1745. A document scanning and input system 1750 receives scanned images of documents from a document input process 1755.

A physical mailroom 1760 receives incoming physical mail 1765 from any and all suitable sources of physical mail. In the physical mailroom 1760, a mail clerk engages in a manual process to sort the mail and determine the mail type and recipient 1770 for each physical piece of mail. The mail clerk then makes a manual decision at 1772 to scan/copy/route the physical piece of mail. When the decision at 1772 is to route the physical piece of mail to a particular person or organization, the physical piece of mail is sent to the in-office hard copy mail system 1776 with the name of the person or organization, which results in the physical piece of mail being routed to a designated person or organization. When the decision at 1772 is to copy the physical piece of mail, the piece of mail is sent to a copier 1774, and copies are then returned to the physical mailroom for routing of the copies to the in-office hard copy mail system 1776. When the decision at 1772 is to scan the physical piece of mail, the physical piece of mail is sent to the document input process 1755, which is the process for scanning and inputting the piece of mail into the document scanning and input system 1750.

The manual processes at 1770 and 1772 are subject to human error. What is needed is a more reliable way to process incoming physical mail in a way that is flexible and reliable without being as subject to human error, and in a way that better services employees who work from home. The digital mailroom application disclosed and claimed herein provides a way to process incoming physical mail in a more automated fashion using defined mail delivery settings and allows easy and automatic delivery of digital mail pieces to employees, even those working remotely.

Figure 18:
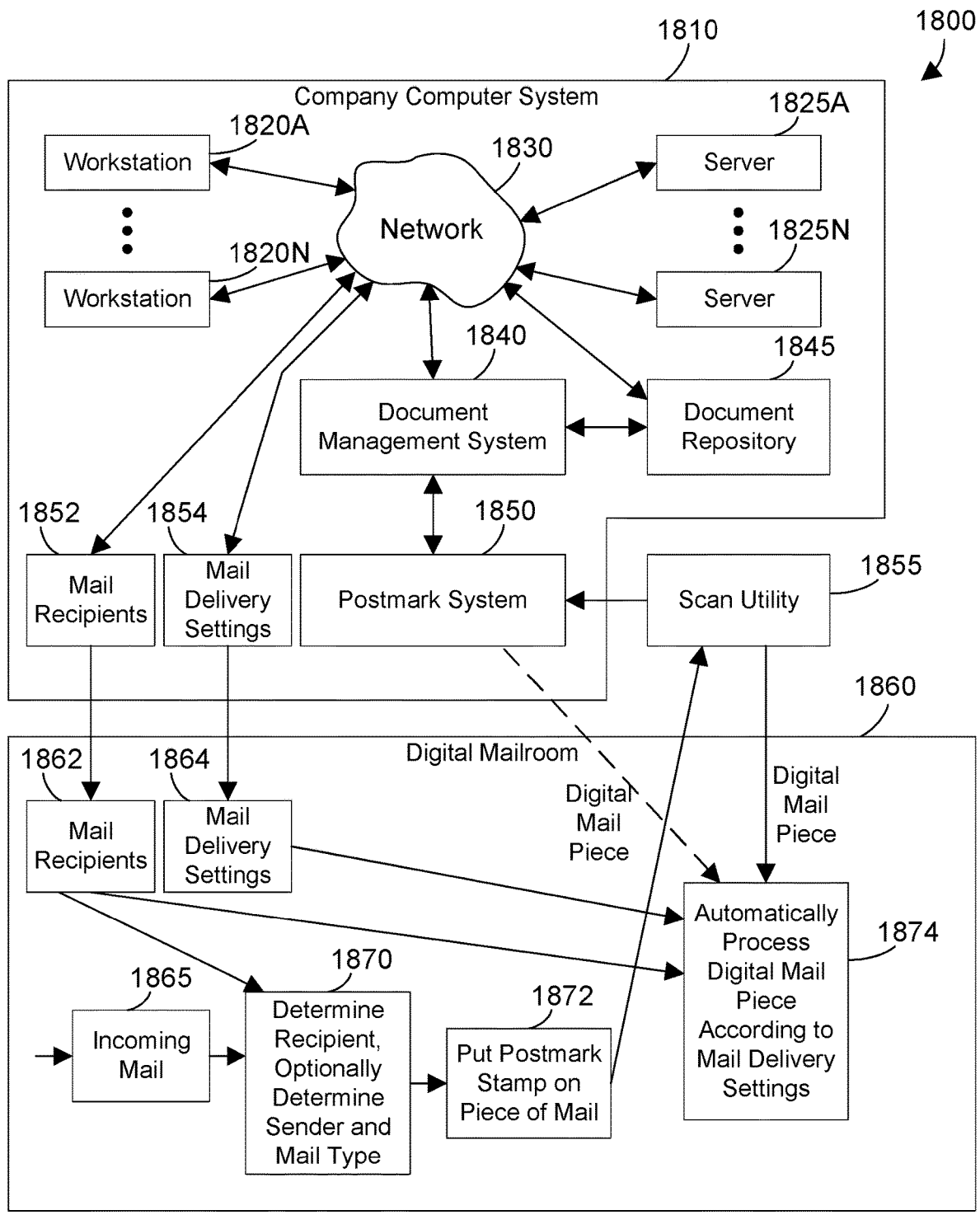
FIG. 18 is a block diagram of a system in accordance with a specific preferred embodiment.

Referring to FIG. 18, a system 1800 in accordance with a preferred embodiment includes a client computer system 1810 that includes many features similar to those shown in company computer system 1710 in FIG. 17, including multiple workstations 1820A, . . . 1820N and multiple servers 1825A, . . . 1825N coupled to a network 1830. Company computer system 1810 also includes a document management system 1840 that stores and manages documents in a document repository 1845. The company computer system 1810 additionally includes a postmark system 1850, which is computer software created and sold by the applicant of this patent application DocSolid LLC. The postmark system 1850 uses a graphical symbol called a "postmark" to store and manage documents by the document management system 1840. Various aspects of the postmark system 1850 are covered in the patents owned by DocSolid, LLC referenced in the Background of the Invention. For example, the postmark system 1850 preferably includes quality assurance processing of a scanned image as described in U.S. Pat. No. 9,460,356, including verifying a page count of the scanned document corresponds to a page count of the physical document, verifying each page of the scanned document is in a correct orientation, and verifying each page of the scanned document is complete. When the postmark system 1850 performs such quality assurance processing, the digital mail piece may be passed from the scan utility 1855 to the postmark system 1850, which then returns the digital mail piece to the automated process at 1874, as shown by the dotted line in FIG. 18.

The digital mailroom 1860 is one suitable implementation for the digital mailroom 220 in FIG. 2, and includes the digital mailroom application 230 that may include any or all of the features shown in FIG. 2. The company computer system 1810 includes a list of mail recipients 1852 and mail delivery settings 1854 that are sent to, and received by, the digital mailroom application in the digital mailroom 1860, as described in FIG. 3 and as shown at 1862 and 1864 in FIG. 18. The incoming mail 1865 is processed by a mail clerk after the mail clerk authenticates to the digital mailroom application, as shown in step 410 in FIG. 4. A record is opened in the user interface of the digital mailroom application. The recipient of the piece of mail is determined at 1870 in FIG. 18, and the sender type and mail type may be optionally determined as well. The determination of recipient in step 1870 may be made by a mail clerk visually identifying a recipient from the piece of mail, and selecting that recipient from a drop-down list of mail recipients in the record in the user interface of the digital mailroom application. This drop-down list includes the ability to type a person's name using known type-ahead technology, thereby allowing the mail clerk to select the recipient more quickly from the drop-down list, especially when the list includes a large number of mail recipients. The mail clerk puts a postmark stamp on the piece of mail at 1872. A postmark stamp preferably comes in a roll of stamps about the size of a postage stamp, with each stamp having a globally-unique identifier that includes a number that is one larger than the number on the preceding stamp, thereby providing a globally-unique identifier for each piece of mail. The mail clerk enters the number of the postmark stamp on the piece of mail into the record in the digital mailroom application, thereby correlating the postmark stamp to the record in the digital mailroom. Because the stamps are numbered sequentially, once the mail clerk enters the first number of the postmark stamp in the roll, the digital mailroom application will automatically populate the next stamp number in the record when the next record is created. Once the physical postmark stamp is placed on the first page of the physical piece of mail at 1872 and the number is entered or automatically populated into the record of the digital mailroom application, the piece of mail is then placed in an inbox for documents to be scanned into the postmark system 1850 using a scan utility 1855. This process for identifying a piece of mail using a postmark stamp, then scanning the piece of mail and correlating the digital mail piece to the record in the digital mailroom application is very similar to the process for entering other documents besides mail into the postmark system 1850 using a scan utility 1855. When the scan utility 1855 scans the document, it reads the postmark on the stamp on the first page of the piece of mail, then returns the scanned image(s) of the piece of mail correlated with the postmark stamp as a digital mail piece to the digital mailroom application. The digital mailroom application then automatically processes the digital mail piece according to the defined mail delivery settings that apply to the piece of mail, as shown at 1874 in FIG. 18.

Figure 19:
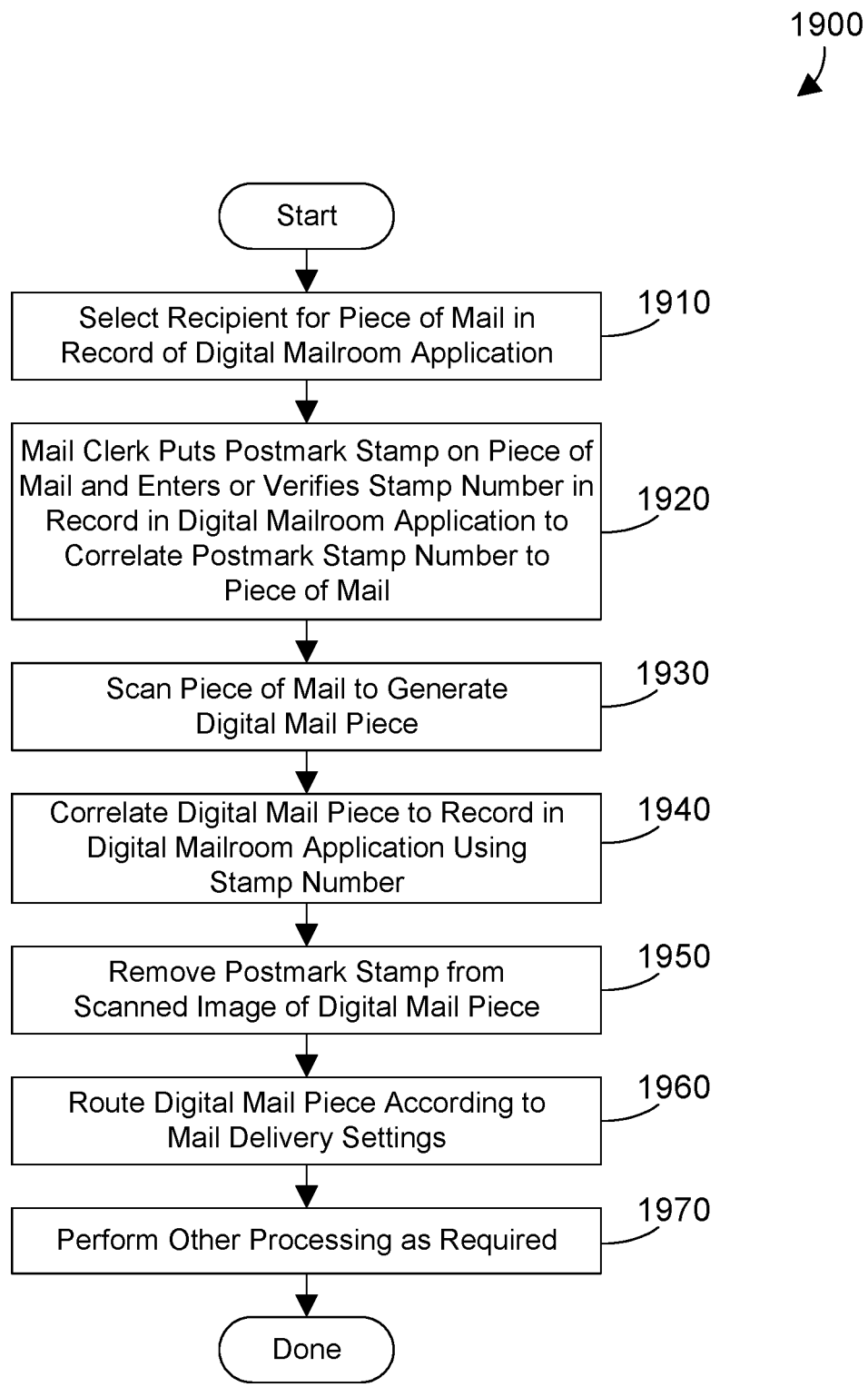
FIG. 19 is a flow diagram of a method in accordance with a preferred embodiment for processing mail in the digital mailroom in FIG. 18.

A method 1900 for processing mail using a digital mailroom application as disclosed and claimed herein for the system 1800 in FIG. 18 is shown in FIG. 19. A recipient for a physical piece of mail is selected in a record of the digital mailroom application (step 1910). This selection can be done, for example, by a mail clerk visually identifying the recipient from the physical piece of mail, then selecting the mail recipient in the record in the digital mailroom application. The mail clerk puts a postmark stamp on a piece of mail and enters or verifies the automatically populated stamp number in the digital mailroom application to correlate the postmark stamp number to the piece of mail (step 1920). The piece of mail is then scanned to generate a corresponding digital mail piece (step 1930). The digital mail piece is sent to the digital mailroom application and correlated to the record in the digital mailroom application using the stamp number (step 1940). The postmark stamp at this point has served its purpose of correlating a scanned image of a document to a record in the digital mailroom application, so the postmark stamp may be removed from the scanned image of the digital mail piece (step 1950). Note that step 1950 is optional. The digital mail piece is then routed according to the defined mail delivery settings (step 1960). Any other processing specified in the mail delivery settings is performed (step 1970). Other processing in step 1970 may include, without limitation, providing notifications, storing the digital mail piece in a repository, enforcing an ethical wall or legal hold, enforcing regulatory compliance, etc.

In a first suitable embodiment, the only piece of information the digital mailroom application needs to process a piece of mail is the recipient and the postmark stamp number. The sender and mail type can optionally be specified in the digital mailroom application record, but are not required. In this first embodiment, the mail piece is processed according to any defined system delivery settings and the recipient delivery settings. In a second suitable embodiment, the recipient and sender or mail type can be entered into a record in the digital mailroom application, allowing additional processing based on sender mail delivery settings and/or mail type delivery settings, as discussed in more detail above.

In the embodiments discussed above, the determination of recipient at 1870 in FIG. 18 is done by a mail clerk selecting a recipient from the list of mail recipients 1862 in a record in the digital mailroom application, then putting the postmark stamp on the piece of mail at 1872 and sending the piece of mail to the scan utility 1855, which scans the piece of mail and returns the corresponding digital mail piece correlated to the postmark stamp. In an alternative implementation, the mail clerk need not select a recipient at 1870. Instead, the mail clerk puts the envelope as the top page of the piece of mail to be scanned, puts the postmark stamp on the envelope, then sends the piece of mail to the scan utility 1855. The scan utility 1855 scans the envelope and the rest of the piece of mail to generate a digital piece of mail. Because the scan utility 1855 searches for the postmark stamp, it also returns the number from the postmark stamp to the digital mailroom application. If the digital mailroom application sees no existing record for the returned postmark stamp number, a record corresponding to the returned postmark stamp number is created. The determination of recipient can then be made by the digital mail analyzer 246 shown in FIG. 2 in the digital mailroom application performing an analysis on the text of the envelope to automatically determine which recipient in the list of mail recipients 1862 is the addressee of the piece of mail. The scanning of the envelope can include image-zone optical character recognition. Thus, for a standard business-sized envelope, the sender is in the upper left corner while the recipient is in the middle of the envelope. For large envelopes, the image zones can be defined differently, as needed. By automatically determining a recipient from the envelope, greater automation is achieved in processing incoming physical mail.

Figure 20:
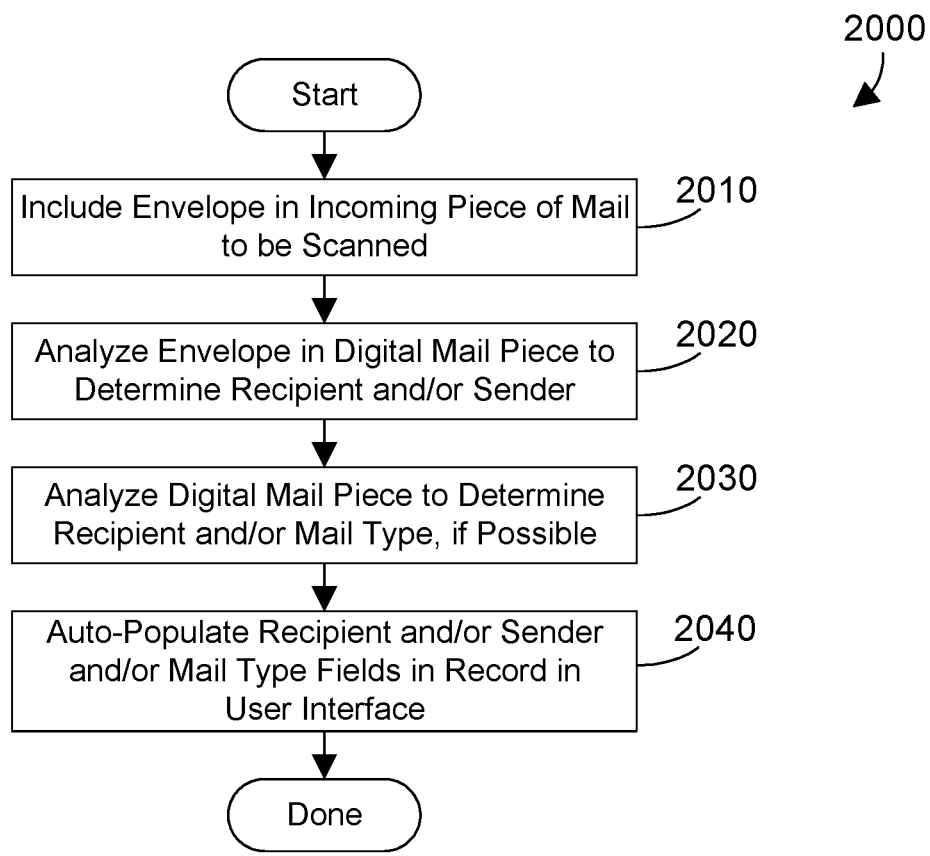
FIG. 20 is a flow diagram of a method in accordance with a preferred embodiment for processing mail in the digital mailroom in FIG. 18.

One suitable example of analyzing the digital mail piece to determine information needed in the digital mailroom application is shown as method 2000 in FIG. 20. The envelope is included in the incoming piece of mail to be scanned (step 2010). The envelope in the digital mail piece is analyzed to determine the recipient and/or sender (step 2020). The digital mail piece is also analyzed to determine the recipient and/or mail type, if possible (step 2030). The recipient and/or sender and/or mail type fields in the record in the user interface of the digital mailroom application can then be auto-populated according to the analysis done in step 2020 and 2030 (step 2040). Note the mail clerk can override any fields that are auto-populated in step 2040, as needed.

Figure 21:
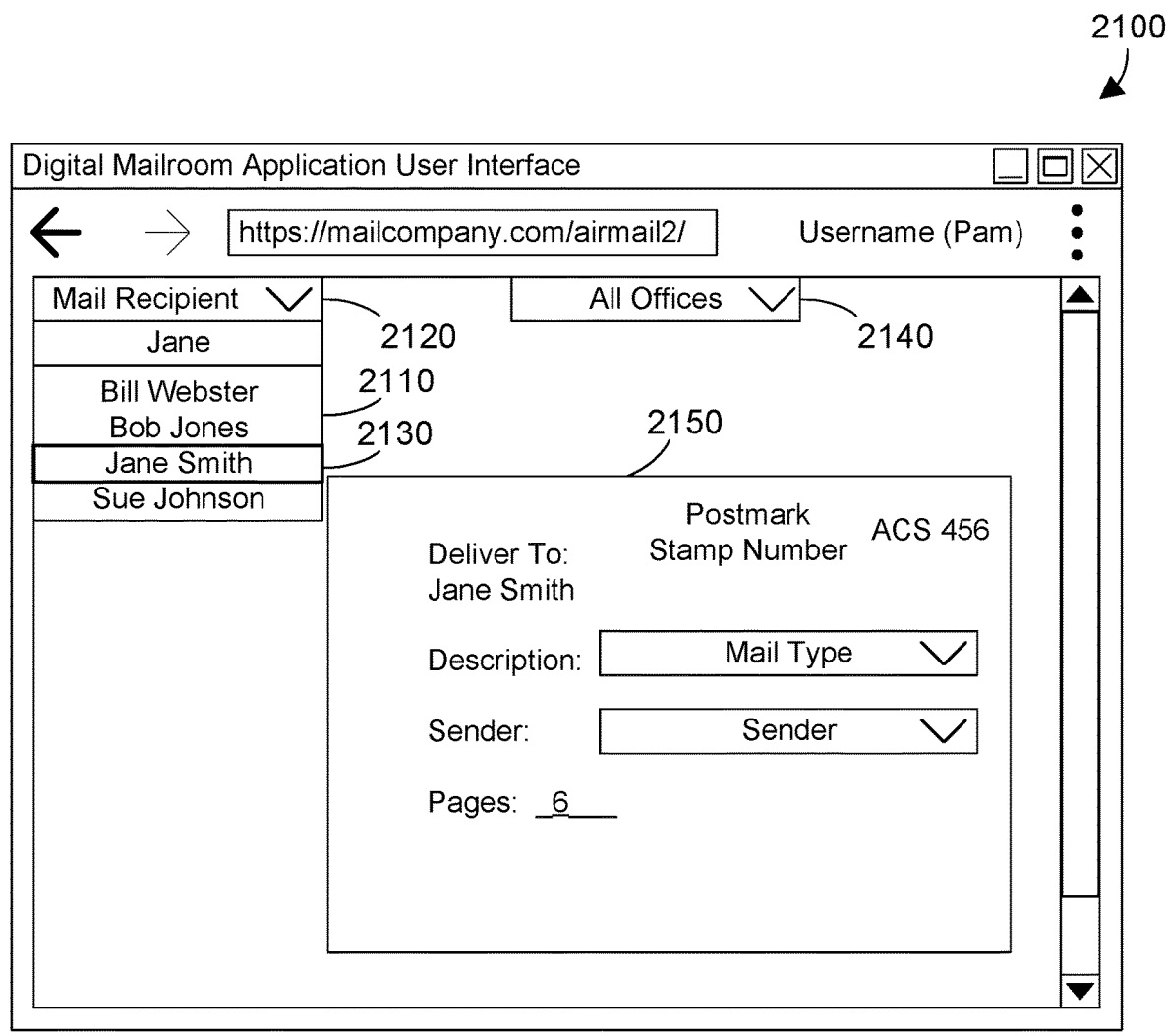
FIG. 21 is a sample user interface for the digital mailroom application.

An example user interface 2100 for the digital mailroom application is shown in FIG. 21. User interface 2100 is one suitable example of the browser interface 233 in user interface 232 in FIG. 2. The user interface 2100 is most preferably used by a mail clerk, and the term "user" discussed with respect to FIG. 21 includes a mail clerk. The user interface 2100 represents the input screen for a record 241 in the digital mailroom application, as shown in FIG. 2. User interface 2100 preferably includes a drop-down box 2110 for the Mail Recipient field 2120 that allows a user to click on the down arrow, then select a mail recipient. The list of mail recipients displayed to the user is the list of mail recipients received from the company computer system, such as mail recipients 234 in FIG. 2 and mail recipients 1862 in FIG. 18. Note the list of mail recipients could be constrained to mail recipients in a particular organization or geographical location. In the specific example in FIG. 21, a box 2140 shows All Offices with a drop-down arrow that allows the user to select All Offices or one of the individual offices listed in the drop-down list, which is not shown in FIG. 21. When a particular office is selected from the drop-down box for box 2140, only the mail recipients in that office are displayed in the Mail Recipient drop-down box 2110. Note the Mail Recipient field 2120 includes a text box where the user can start typing a recipient's name, which results in the recipient(s) that match the typed name showing up or being highlighted in the drop-down box. For the example in FIG. 21, the user typed Jane into the text entry box under the mail recipient field 2120, which results in Jane Smith being highlighted for selection, as shown by the box around Jane Smite at 2130 in FIG. 21.

Once a recipient has been selected, the recipient is shown in the box 2150 that represents a record in the digital mailroom application that corresponds to a physical piece of mail. Thus, box 2150 shows Deliver To: Jane Smith because Jane Smith is the mail recipient (or addressee) for the physical piece of mail. The user may enter a mail type from the drop-down box in the Description field, and may also enter a sender from the drop-down box in the Sender field. The user may also enter the number of pages in the physical piece of mail. The user must also correlate the record 2150 in the digital mailroom application to a postmark stamp number, which is preferably a globally unique identifier. For the example in FIG. 21, we assume the postmark stamp number for the stamp the user put on the physical piece of mail has the stamp number ACS 456, and this number is auto-populated into the record 2150 based on the previous stamp number being ACS 455. For the specific record 2150 shown in FIG. 21, we assume the user did not enter a Mail Type in the Description field or a Sender in the Sender field, but did enter that the physical piece of mail has six pages.

Once the recipient and postmark stamp number are entered into the record 2150, the postmark stamp is placed on the piece of mail and sent to the scan utility 1855. The scan utility 1855 scans the piece of mail to generate a digital mail piece, and correlates the digital mail piece to the postmark stamp number. When the digital mail piece with its corresponding postmark stamp number is returned to the digital mailroom application, all of the processing for the digital mail piece can be performed automatically without interaction or intervention by the mail clerk, thereby removing many potential sources of human error from the process of processing physical incoming mail.

As discussed above with reference to FIG. 20, in some implementations, the recipient need not be manually entered by the mail clerk as shown in FIG. 21. Instead, a physical piece of mail may be scanned, and the scanned image and the postmark stamp number are then returned to the digital mailroom application. When the digital mail piece correlator 244 in FIG. 2 determines that a record does not exist for the returned postmark stamp number, the digital mail piece correlator 244 creates a new record automatically. The digital mail analyzer 246 in FIG. 2 can then analyze the envelope to automatically determine the recipient, then auto-populate the recipient field in the record 2150.

The digital mailroom application disclosed herein provides a way to process incoming physical mail in a manner that does not require direct access to the company computer system. This means mail can be processed by a mail clerk that does not have access, training or expertise in the various systems on the company computer system. This also means mail for a company can be processed by a different company that provides mail processing services, and this company could provide these mail processing services to many different companies. Thus, a company can change their main mailing and delivery address to an address of a mail processing company that uses the digital mailroom application, and the mail processing company can then process the company's mail according to the mail recipients and the mail delivery settings received from the company, thereby alleviating the burden on the company to have company personnel process incoming mail. In addition, the digital mailroom application could enable a company to centralize multiple mailrooms into one to save money.

The digital mailroom application also provides a solution to significant problems that have arisen during the global pandemic due to employees being forced all of a sudden to work from home. Many companies learned that processing incoming mail and delivering the incoming mail and notifications in digital form is very challenging without the appropriate infrastructure in place. The digital mailroom application disclosed herein provides such an infrastructure that makes processing incoming physical mail very easy, flexible, and powerful.

A digital mailroom application is used by a mail clerk to process incoming physical mail. The digital mailroom application receives a list of mail recipients and mail delivery settings, then processes the incoming physical mail using the list of mail recipients and mail delivery settings. A piece of incoming physical mail can be processed by determining one of the mail recipients as the recipient for the piece of physical mail. The piece of physical mail is then scanned to generate a corresponding digital mail piece, which is routed electronically based on the defined mail delivery settings. The mail delivery settings can specify to send a digital mail piece to one or more entities based on the recipient, sender or mail type, to send one or more notifications to one or more entities based on the recipient, sender or mail type, to perform one or more additional functions, and the format for the digital mail piece and for notification(s) for the digital mail piece.

The figures and specification discussed above support an apparatus comprising: at least one processor; a memory coupled to the at least one processor; and a digital mailroom application residing in the memory and executed by the at least one processor, the digital mailroom application processing incoming physical mail according to a list of mail recipients and a plurality of mail delivery settings, the digital mailroom application receiving a selection of a recipient in the list of mail recipients for a physical piece of mail, receiving a scan of the physical piece of mail that is a digital mail piece corresponding to the physical piece of mail, and routing the digital mail piece according to the plurality of mail delivery settings.

The figures and specification discussed above further support an apparatus comprising: at least one processor; a memory coupled to the at least one processor; a list of mail recipients residing in the memory; a list of mail delivery settings residing in the memory, wherein the list of mail delivery settings comprises: at least one system delivery setting that specifies whether to send a digital mail piece to a document repository; a plurality of recipient delivery settings that specifies at least one entity to receive a digital mail piece based on a selected one of the list of mail recipients and that specifies at least one entity to which a notification of the digital mail piece is sent based on a selected one of the list of mail recipients and a format for the notification of the digital mail piece; at least one sender delivery setting that specifies at least one entity to receive a digital mail piece based on a sender of the physical piece of mail corresponding to the digital mail piece and that specifies at least one entity to which a notification of the digital mail piece is sent based on a sender of the physical piece of mail corresponding to the digital mail piece and a format for the notification of the digital mail piece; at least one mail type delivery setting that specifies at least one entity to receive a digital mail piece based on a mail type of the physical piece of mail corresponding to the digital mail piece and that specifies at least one entity to which a notification of the digital mail piece is sent based on the mail type of the physical piece of mail corresponding to the digital mail piece and a format for the notification of the digital mail piece; a digital mailroom application residing in the memory and executed by the at least one processor, the digital mailroom application processing incoming physical mail according to the list of mail recipients and a the list of mail delivery settings, the digital mailroom application receiving a selection of a recipient in the list of mail recipients for a physical piece of mail, receiving a scan of the physical piece of mail that is a digital mail piece corresponding to the physical piece of mail, routing the digital mail piece according to the plurality of mail delivery settings, providing at least one notification of the digital mail piece according to the plurality of delivery mail settings, and performing other processing corresponding to the digital mail piece as specified in the plurality of mail delivery settings.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a digital mailroom application residing in the memory and executed by the at least one processor, the digital mailroom application processing incoming physical mail according to a list of mail recipients and a plurality of mail delivery settings, the digital mailroom application receiving a selection of a recipient in the list of mail recipients for a physical piece of mail, receiving a scan of the physical piece of mail that is a digital mail piece corresponding to the physical piece of mail, and routing the digital mail piece according to the plurality of mail delivery settings, wherein the plurality of mail delivery settings specifies a person who is an addressee of the physical piece of mail to receive the digital mail piece and a person who is not an addressee of the physical piece of mail to receive the digital mail piece, wherein the digital mailroom application, in response to the plurality of mail delivery settings, routes the digital mail piece to the person who is an addressee and routes the digital mail piece to the person who is not an addressee, wherein the plurality of mail delivery settings specify to send a notification of the digital mail piece to the person who is not an addressee of the physical mail piece and do not specify to send a notification of the digital mail piece to the person who is an addressee of the physical mail piece, resulting in the digital mailroom application sending the notification of the digital mail piece to the person who is not the addressee of the physical mail piece and not sending the notification of the digital mail piece to the person who is the addressee of the physical mail piece.

2. The apparatus of claim 1 wherein the digital mailroom application provides other processing corresponding to the digital mail piece as specified in the plurality of mail delivery settings.

3. The apparatus of claim 1 wherein the digital mailroom application correlates the digital mail piece to the physical piece of mail using a globally unique identifier.

4. The apparatus of claim 1 wherein the plurality of mail delivery settings specifies whether to send the digital piece of mail to a document repository.

5. The apparatus of claim 1 wherein at least one entity to receive the digital mail piece is specified in the plurality of mail delivery settings based on at least one of the selected recipient, a sender of the physical piece of mail, and a mail type of the physical piece of mail.

6. The apparatus of claim 5 wherein the at least one entity comprises the person who is an addressee of the physical piece of mail.

7. The apparatus of claim 5 wherein the at least one entity comprises the person who is not an addressee of the physical piece of mail.

8. The apparatus of claim 5 wherein the at least one entity comprises an organization.

9. The apparatus of claim 1 wherein the plurality of mail delivery settings specifies at least one entity to receive at least one notification relating to the digital mail piece.

10. The apparatus of claim 9 wherein the at least one entity to receive at least one notification relating to the digital mail piece is specified in the plurality of mail delivery settings based on at least one of the selected recipient, a sender of the physical piece of mail, and a mail type of the physical piece of mail.

11. The apparatus of claim 9 wherein the plurality of mail delivery settings specifies a format for the at least one notification relating to the digital mail piece.

12. The apparatus of claim 1 wherein the selection of the recipient is performed by a mail clerk using a user interface in the digital mailroom application.

13. The apparatus of claim 1 wherein the selection of the recipient is performed automatically by the digital mailroom application analyzing the digital mail piece to determine the recipient of the digital mail piece.

14. The apparatus of claim 1 wherein the list of mail recipients and the list of mail delivery settings are received by the digital mailroom application from a company for which the digital mailroom application processes the incoming physical mail.

15. The apparatus of claim 1 wherein the digital mailroom application comprises a recipient interface that allows a selected recipient on the list of mail recipients to select and change at least one of the mail delivery settings corresponding to the selected recipient.

16. The apparatus of claim 1 wherein the digital mailroom application comprises a browser-based user interface for a mail clerk to access the digital mailroom application.

17. The apparatus of claim 1 wherein the digital mailroom application comprises a digital mail analyzer that analyzes a selected digital mail piece and based on the analysis automatically populates at least one field in a user interface of the digital mailroom application.

18. The apparatus of claim 1 wherein the plurality of mail delivery settings comprises at least one setting that prevents the digital mail piece from being routed to at least one person.

19. The apparatus of claim 1 wherein the plurality of mail delivery settings comprises at least one setting that assures the digital mail piece is kept for a specified period of time.

20. The apparatus of claim 1 wherein the plurality of mail delivery settings comprises regulatory compliance settings that define processing corresponding to the digital mail piece to assure regulatory compliance.

21. The apparatus of claim 1 wherein the plurality of mail delivery settings specify to send at least one notification to at least one entity when a delivered digital mail piece is not opened for a specified period of time.

22. An apparatus comprising:
- at least one processor;
- a memory coupled to the at least one processor;
- a list of mail recipients residing in the memory;
- a list of mail delivery settings residing in the memory, wherein the list of mail delivery settings comprises:
  - at least one system delivery setting that specifies whether to send a digital mail piece to a document repository;
  - a plurality of recipient delivery settings that specifies at least one entity to receive a digital mail piece based on a selected one of the list of mail recipients and that specifies at least one entity to which a notification of the digital mail piece is sent based on a selected one of the list of mail recipients and a format for the notification of the digital mail piece, wherein the plurality of delivery settings specifies a person who is an addressee of a physical piece of mail to receive the digital mail piece and a person who is not an addressee of the physical piece of mail to receive the digital mail piece;
  - at least one sender delivery setting that specifies at least one entity to receive a digital mail piece based on a sender of the physical piece of mail corresponding to the digital mail piece and that specifies at least one entity to which a notification of the digital mail piece is sent based on a sender of the physical piece of mail corresponding to the digital mail piece and a format for the notification of the digital mail piece;
  - at least one mail type delivery setting that specifies at least one entity to receive a digital mail piece based on a mail type of the physical piece of mail corresponding to the digital mail piece and that specifies at least one entity to which a notification of the digital mail piece is sent based on the mail type of the physical piece of mail corresponding to the digital mail piece and a format for the notification of the digital mail piece;
- a digital mailroom application residing in the memory and executed by the at least one processor, the digital mailroom application processing incoming physical mail according to the list of mail recipients and a the list of mail delivery settings, the digital mailroom application receiving a selection of a recipient in the list of mail recipients for a physical piece of mail, receiving a scan of the physical piece of mail that is a digital mail piece corresponding to the physical piece of mail, routing the digital mail piece to the person who is an addressee of the physical piece of mail and to the person who is not an addressee of the physical piece of mail according to the plurality of mail delivery settings, providing at least one notification of the digital mail piece to the person who is not the addressee of the physical mail piece and not sending the notification of the digital mail piece to the person who is the addressee of the physical mail piece according to the plurality of mail delivery settings, and performing other processing corresponding to the selected digital mail piece as specified in the plurality of mail delivery settings, wherein the digital mailroom application comprises a recipient interface that allows a selected recipient on the list of mail recipients to select and change at least one of the recipient delivery settings corresponding to the selected recipient.

\* \* \* \* \*